(12) United States Patent
Chang et al.

(10) Patent No.: US 8,768,662 B2
(45) Date of Patent: Jul. 1, 2014

(54) PREDICTING SHRINKAGE OF INJECTION MOLDED PRODUCTS WITH VISCOELASTIC CHARACTERISTIC

(71) Applicant: Coretech System Co., Ltd., Chupei (TW)

(72) Inventors: Rong Yeu Chang, Chupei (TW); Chia Hsiang Hsu, Chupei (TW); Hsien Sen Chiu, Chupei (TW); Shih Po Sun, Chupei (TW); Chen Chieh Wang, Chupei (TW); Huan Chang Tseng, Chupei (TW)

(73) Assignee: Coretech System Co., Ltd., Chupei, Hsinchu County (TW)

( * ) Notice: Subject to any disclaimer, the term of this patent is extended or adjusted under 35 U.S.C. 154(b) by 0 days.

(21) Appl. No.: 14/091,756

(22) Filed: Nov. 27, 2013

(65) Prior Publication Data

US 2014/0156237 A1 Jun. 5, 2014

Related U.S. Application Data

(60) Provisional application No. 61/732,550, filed on Dec. 3, 2012.

(51) Int. Cl.
*B29C 45/76* (2006.01)
*G06F 17/50* (2006.01)

(52) U.S. Cl.
CPC ......... *B29C 45/7693* (2013.01); *G06F 17/5018* (2013.01); *B29C 2945/76588* (2013.01); *B29C 2945/7605* (2013.01); *B29C 2945/76103* (2013.01)
USPC ................................................. 703/2; 703/9

(58) Field of Classification Search
CPC .............. G06F 17/5018; B29C 45/693; B29C 2945/76588; B29C 2945/7605; B29C 2945/76103
USPC ............................................. 703/2, 9; 702/50
See application file for complete search history.

(56) References Cited

U.S. PATENT DOCUMENTS 7,979,257 B2 * 7/2011 Yu et al. ........................... 703/9
2004/0230411 A1 * 11/2004 Zheng et al. ...................... 703/6

OTHER PUBLICATIONS

Fernández, Mercedes, et al. "Determining the Pressure Dependency of the Viscosity Using PVT Data: A Practical Alternative for Thermoplastics" Polymer Testing, vol. 28, pp. 109-113 (2009).*

Zheng, R., et al. "Thermoviscoelastic Simulation of Thermally and Pressure-Induced Stresses in Injection Moulding for the Prediction of Shrinkage and Warpage for Fibre-Reinforced Thermoplastic" J. Non-Newtonian Fluid Mech., vol. 84, pp. 159-190 (1999).*

(Continued)

*Primary Examiner* — Kamini S Shah
*Assistant Examiner* — Jay B Hann
(74) *Attorney, Agent, or Firm* — Hamre, Schumann, Mueller & Larson, P.C.

(57) ABSTRACT

A computer-implemented method and non-transitory computer medium for calculating a shrinkage of a molding product comprises a step of using a computer processor to calculate a molding pressure of a molding fluid in a molding cavity by taking into consideration an increase of a shear viscosity of the molding fluid by a decrease of a shear rate, and a step of calculating the shrinkage of the molding products by taking into consideration a variation of a specific volume of the molding fluid as the molding pressure and a molding temperature decrease.

14 Claims, 13 Drawing Sheets

(56) References Cited

OTHER PUBLICATIONS

Peydró et al., Study of rheological behavior during the recovery process of high impact polystyrene using cross-WLF model. Journal of Applied Polymer Science. vol. 120, pp. 2400-2410 (2011).
Bird et al., Dynamics of polymeric liquids. vol. 1: Fluid mechanics, 2nd ed, New York: Wiley, 1987. 670 pages total.
Cardinaels et al., Evaluation and comparison of routes to obtain pressure coefficients from high-pressure capillary rheometry data, Rheologica Acta.46, pp. 495-505 (2007).
Park et al. Measurement of pressure coefficient of melt viscosity: drag flow versus capillary flow. Rheologica Acta. 47, pp. 1023-1038 (2008).

* cited by examiner

PREDICTING SHRINKAGE OF INJECTION MOLDED PRODUCTS WITH VISCOELASTIC CHARACTERISTIC

TECHNICAL FIELD

The present disclosure relates to a computer-implemented method and non-transitory computer medium for calculating shrinkage of molding products.

DISCUSSION OF THE BACKGROUND

In general, the setting of molding conditions in an injection molding machine requires a large number of trial molding operations and a long setting time because the setting work greatly depends on the know-how and experience of an operator, and various physical values affect one another as well.

Therefore, the operator performs a virtual molding, i.e., computer-implemented simulation, by use of CAE (Computer-Assisted Engineering) for injection molding, and the molding conditions are then set based on the virtual molding. In virtual molding by use of CAE, phenomena will occur in a mold cavity within a short period of time; i.e., the result of simulation on resin temperature, pressure, shear rate, etc. can be reflected in molded products.

Therefore, if the molding phenomena occurring within a mold cavity can be grasped accurately, using CAE may enable optimization of molding conditions and stable molding of non-defective products. As described above, since CAE can simulate the physical phenomena occurring within the mold cavity, if analysis accuracy is high, CAE serves as an assisting means which is suitable for optimization of the molding conditions.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY

One aspect of the present disclosure provides an injection molding simulation method and injection molding system using the same.

In accordance with some embodiments of the present disclosure, a computer-implemented method for calculating a shrinkage of a molding product comprises a step of using a computer processor to calculate a molding pressure of a molding fluid in a molding cavity by taking into consideration an increase of a shear viscosity of the molding fluid by a decrease of a shear rate. In some embodiments, the calculating of the shrinkage further takes into consideration a variation of a specific volume of the molding fluid as the molding pressure and a molding temperature decrease.

In accordance with some embodiments of the present disclosure, a non-transitory computer medium contains computer instructions stored therein for causing a computer processor to perform operations for calculating a shrinkage of a molding product, and the operations comprise a step of calculating the shrinkage of the molding product from a molding fluid by taking into consideration an increase of a shear viscosity of the molding fluid by a decrease of a shear rate. In some embodiments, the calculating of the shrinkage further takes into consideration a variation of a specific volume of the molding fluid as the molding pressure and a molding temperature decrease.

The present disclosure provides a VE-Cross-WLF viscosity model for describing the elastic characteristic of the molding fluid like the solid in addition to the viscous characteristic of the molding fluid. The prediction of the molding pressure by using a Cross-WLF viscosity model deviates from the experimental data significantly, i.e., underestimating the filling pressure. In contrast, the prediction of the molding pressure by using the proposed VE-Cross-WLF viscosity model of the present disclosure substantially matches with the experimental data.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "some embodiments," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a computer-implemented method and non-transitory computer medium for calculating shrinkage of molding products. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
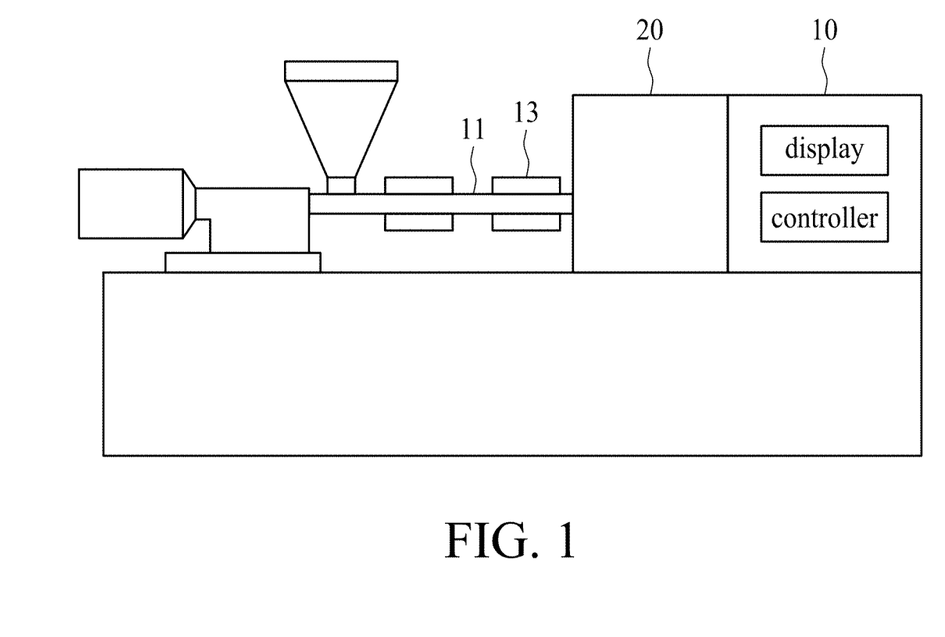
FIG. 1 and FIG. 2 are schematic views of an injection molding machine equipped with a mold in accordance with various embodiments of the present disclosure.
Figure 2:
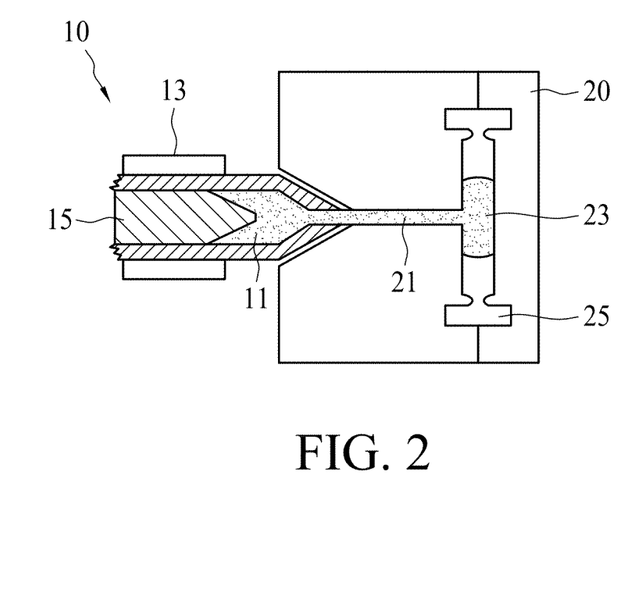

FIG. 1 and FIG. 2 are schematic views of an injection molding machine 10 equipped with a mold 20 in accordance with various embodiments of the present disclosure. The mold 20 includes a sprue 21, a runner 23 and a mold cavity 25. The injection molding machine 10 includes a screw chamber 11, a heating element 13 configured to heat the screw chamber 11, and a screw 15 positioned in the screw chamber 11 for feeding molding material such as thermoplastics into the mold cavity 25 of the mold 20.

Figure 3:
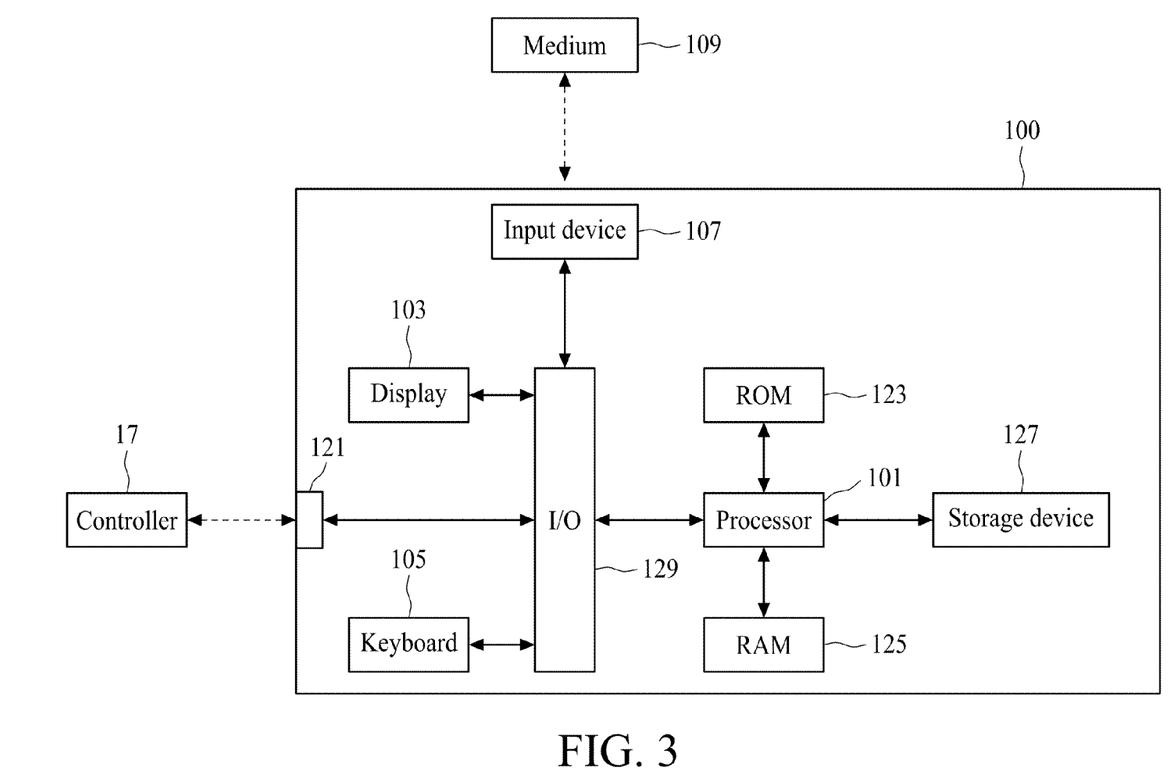
FIG. 3 is a functional block diagram of a computer in accordance with various embodiments of the present disclosure.

FIG. 3 is a functional block diagram of a computer 100 in accordance with various embodiments of the present disclosure. In some embodiments, the computer 100 comprises a computer processor 101 for performing a computer-implemented injection molding simulation method. In some embodiments, the computer 100 includes a read-only memory (ROM) 123, a random access memory (RAM) 125, a storage device 127, an input/output (I/O) interface 129, and a communication port 121 associated with the controller 17 of the injection machine 10. The computer processor 101 operably communicates with the ROM 123, the RAM 125, the storage device 127, and the I/O interface 129.

In some embodiments, the computer 100 may further include a display 103, a keyboard 105, and an input device 107 such as a card reader or an optical disk drive. The input device 107 is configured to input computer instructions (software algorithms) stored in a non-transitory computer-readable medium 130, and the computer processor 101 is configured to execute operations for performing a computer-implemented injection molding simulation method according to the computer instructions. The computer processor 101 reads software algorithms from the input device 107 or the storage device 127, executes the calculation steps, and stores the calculated result in the RAM 125.

In some embodiments of the present disclosure, the storage device 127 or an external storage medium 109 contains computer instructions stored therein for causing the computer processor to perform operations for calculating a shrinkage of a molding product, and the operations comprise a step of calculating the shrinkage of the molding product from a molding fluid by taking into consideration an increase of a shear viscosity of the molding fluid by a decrease of a shear rate. In some embodiments, the calculating of the shrinkage further takes into consideration a variation of a specific volume of the molding fluid as the molding pressure and a molding temperature decrease.

The injection molding of plastic products having a thin wall portion sometimes require a high injection speed, wherein the screw 15 approaches the sprue 21 to apply a high filling pressure to the mold cavity 25. Even when applying this high filling pressure, the molding product still suffers from serious shrinkage, which may be caused by ineffective packing. Interestingly, current injection molding simulation methods also over-predict this packing pressure, and contrary to common belief, the prediction results in expansion instead of shrinkage.

Based on the understanding of the injection molding process, the packing process usually accompanies with a low shear rate and low filling pressure. However, for a high filling pressure process, the pressure distribution inside the sprue-runner-cavity system is unclear. In general, one may expect that the pressure increases with the fluid viscosity. Experimental results suggest that from the filling to the packing stage, the high pressure will result in an obvious increase in viscosity as the shear rate becomes lower. It is likely that such results closely relate to the shrinkage prediction problem.

Figure 4:
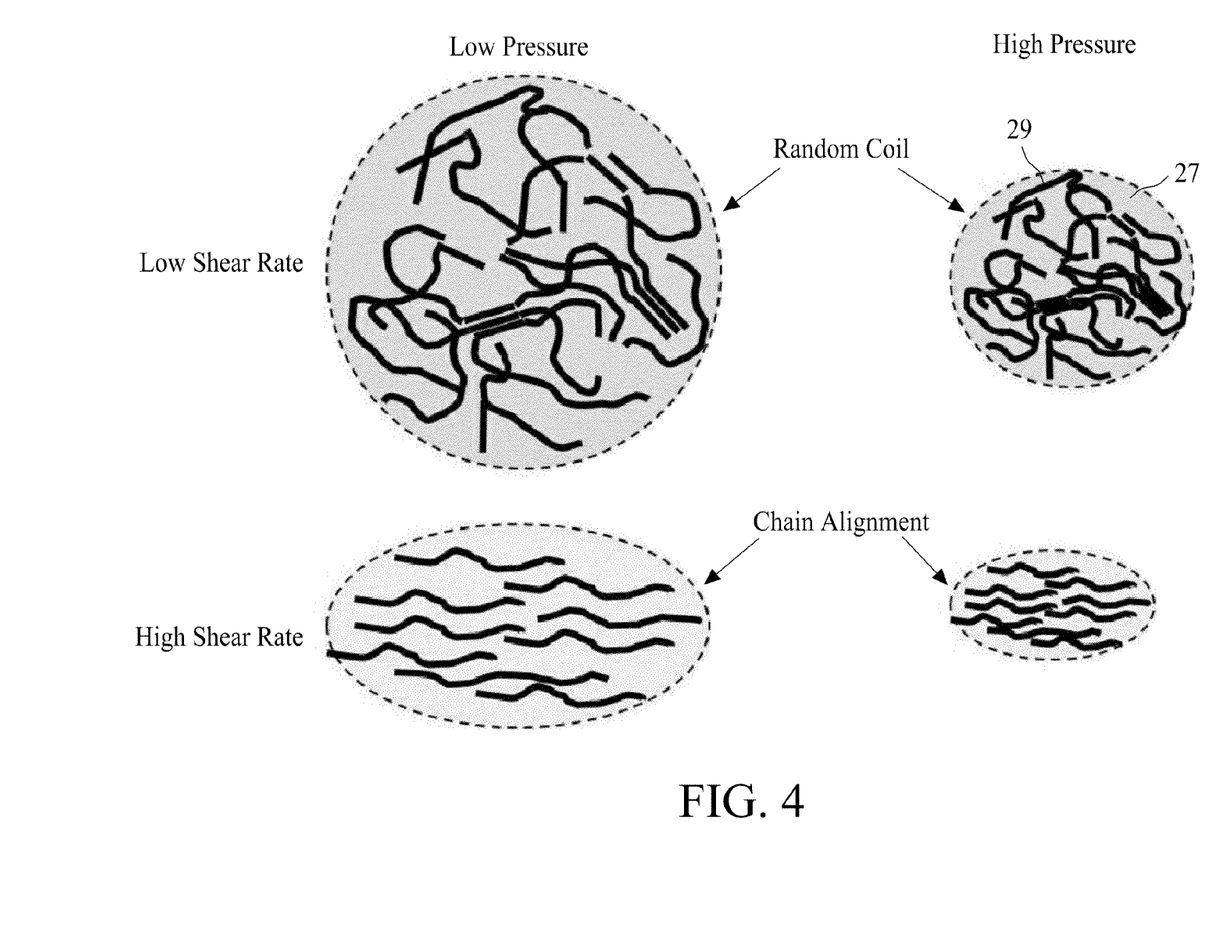
FIG. 4 illustrates the microscopic view of a molding fluid having polymer chains at different pressures and different shear rates.

FIG. 4 illustrates the microscopic view of a molding fluid 27 having polymer chains 29 at different pressures and different shear rates. At low pressures and low shear rates, the polymer chains 29 exist in a stable state of a random coil. As the polymer chains 29 are at a high pressure, the distance between the polymer chains 29 is shortened and the coil size becomes smaller. Due to the low chain mobility or small free volume, the shear viscosity increases dramatically at a low shear rate, the molding fluid 27 at the macroscopic view is closely resemblant to a solid or a rubber-like member with a viscoelastic characteristic, i.e., the molding fluid 27 has the elastic characteristic of the solid in addition to the viscous characteristic of the fluid. On the other hand, at a high shear rate, the disentanglement of the polymer chains 29 are aligned along the flow direction of the molding fluid 27, regardless of whether the polymer chains 29 is in a low or high pressure.

Due to the high packing process and low shear rates, the mobility and free volume of polymer chains 29 are relatively small. According to the free volume theory, the zero-shear-rate viscosity is increased with free volume. Therefore, from the filling process to the packing process, the molding fluid 27 may possess a low-shear-rate shear thinning at a high pressure and low shear rates. An expression describing this shear viscosity feature is one of the key points to solving the shrinkage prediction problem during the high packing pressure.

The shear viscosity is generally related to temperature, pressure, and shear rate. The flow curve of the shear viscosity versus shear rate can be divided into two regions: Newtonian plateau region at low shear rates (zero-shear-rate viscosity independent of shear rate) and shear thinning region at high shear rates (viscosity decreases with increasing shear rates). One commonly used model in polymer processing is the Cross-WLF viscosity model; however, the Cross-WLF viscosity model falls short of describing low-shear-rate shear thinning at a high pressure and low shear rates.

The Cross-WLF viscosity model describe the shear viscosity as follows:

$$\eta(\dot{\gamma}, T, P) = \frac{\eta_0}{1 + \left(\frac{\eta_0 \dot{\gamma}}{\tau^*}\right)^{1-n}}; \tag{1}$$

$$\eta_0 = \eta_0(T, P); \tag{2}$$

$$\eta_0 = D_1 \exp\left(\frac{-A_1(T - T_c)}{A_2 + (T - T_c)}\right), \tag{3}$$

$$T_c = D_2 + D_3 P \text{ and } A_2 = \tilde{A}_2 + D_3 P.$$

In the above expression, seven parameters are used to fit the experimental data, including n, $\tau^*$, $A_1$, $\tilde{A}_2$, $D_1$, $D_2$ and $D_3$.

Figure 5:
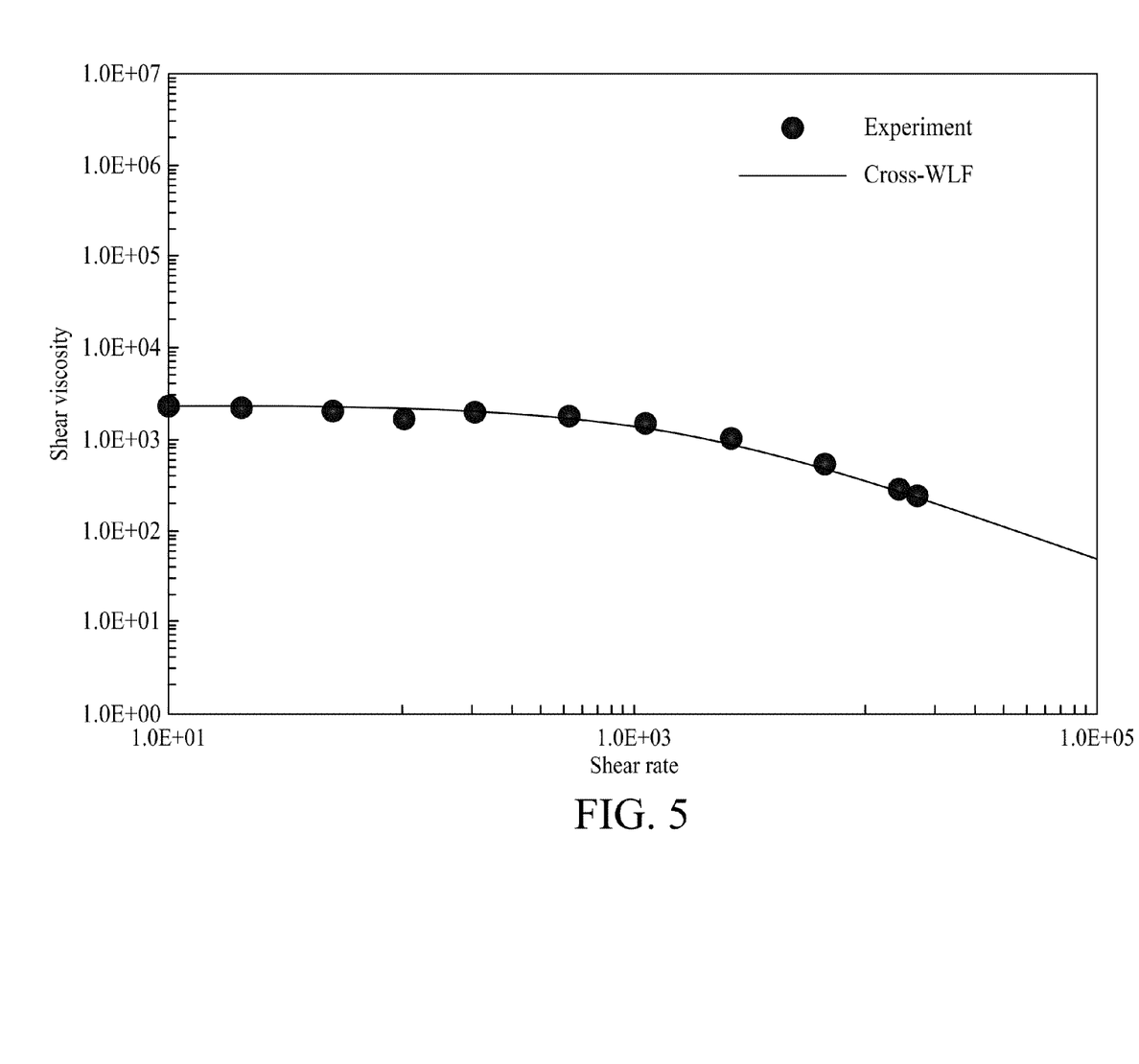
FIG. 5 shows the flow curve of the shear viscosity versus shear rate at a constant temperature (300° C.) and low constant pressure (0.1 MPa)

FIG. 5 shows the flow curve of the shear viscosity versus shear rate at a constant temperature (300° C.) and low constant pressure (0.1 MPa). Using the capillary viscometer to measure the viscosity of the Polycarbonates (PC), it is clear that there are two regions in the flow curve: Newtonian plateau at low shear rates and shear thinning at high shear rates.

Figure 6:
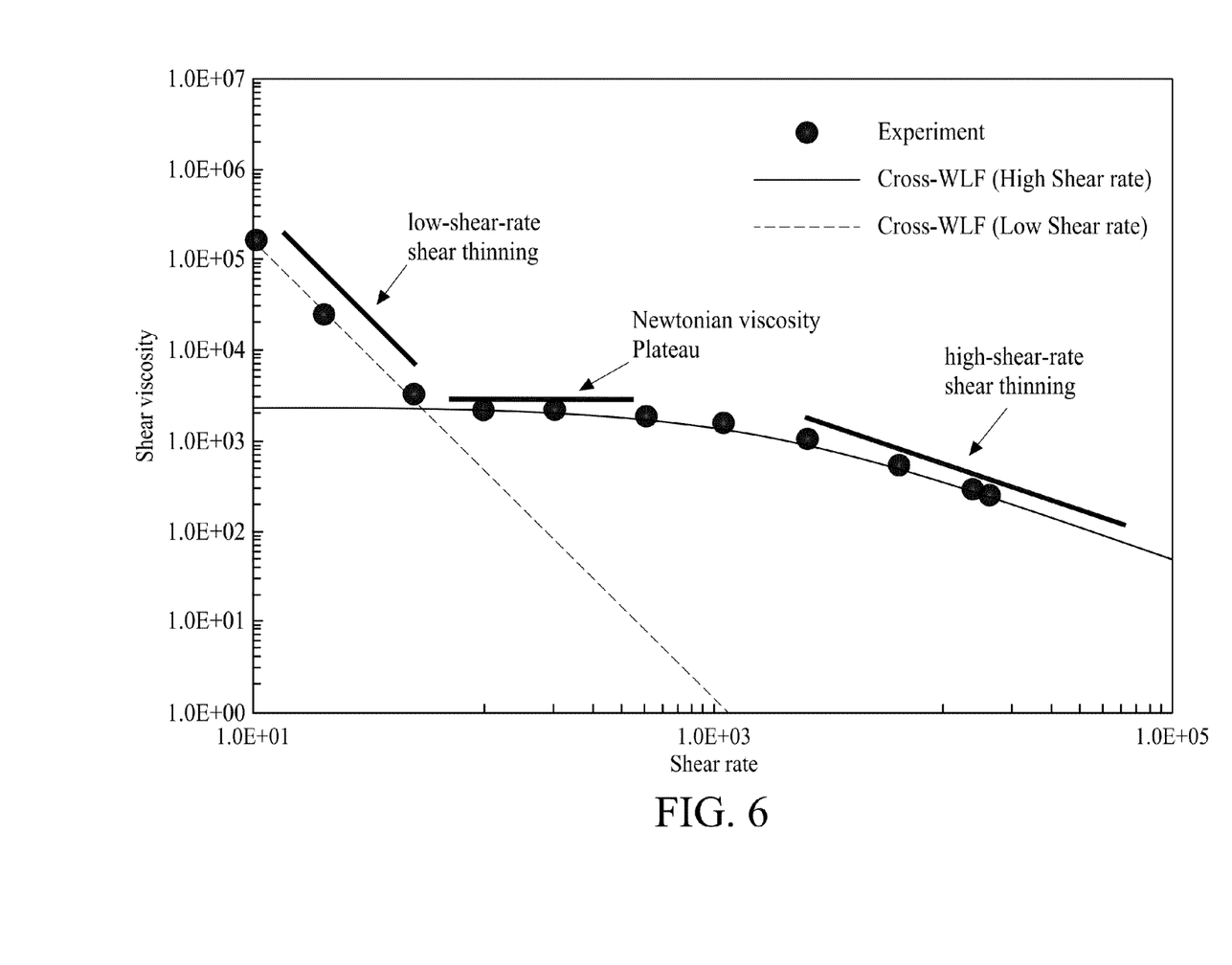
FIG. 6 shows a three-region flow curve: low-shear-rate shear thinning, middle-shear-rate shear Newtonian plateau, and high-shear-rate shear thinning.

FIG. 6 shows a three-region flow curve: low-shear-rate shear thinning, middle-shear-rate shear Newtonian plateau, and high-shear-rate shear thinning. As the pressure increases to a higher value (1.0 MPa) from the low value (0.1 MPa), it is significant to find a low-shear-rate shear thinning, which indicates increasing shear viscosities with decreasing shear rates. Moreover, the Cross-WLF model can display a good curve fitting for the high-shear-rate experimental data and a poor curve fitting for the low-shear-rate, or vice versa. Thus, the Cross-WLF model cannot reliably describe these three regions.

To describe the low-shear-rate shear thinning phenomenon, the present disclosure proposes a new model for molding fluids at high pressures and low shear rates possessing a viscoelastic (VE) characteristic, $\eta_0^{VE}(T,P,\dot{\gamma})$, to replace the zero-shear-rate viscosity, $\eta_0(T,P)$ in the Cross-WLF viscosity model. The VE zero-shear-rate viscosity $\eta_0^{VE}(T,P,\dot{\gamma})$ is defined by the term $\eta_0(T,P)$ multiplied by a viscoelastic (VE) term, $\eta^{VE}(P,\dot{\gamma})$.

$$\eta(\dot{\gamma}, T, P) = \frac{\eta_0^{VE}}{1 + \left(\frac{\eta_0^{VE} \dot{\gamma}}{\tau^*}\right)^{1-n}}; \tag{4}$$

$$\eta_0^{VE}(T,P,\dot{\gamma}) = \eta_0(T,P)\eta^{VE}(P,\dot{\gamma}) \tag{5}$$

$$\eta_0(T, P) = D_1 \exp\left(\frac{-A_1(T - T_c)}{A_2 + (T - T_c)}\right), \tag{6}$$

$$T_c = D_2 + D_3 P \text{ and } A_2 = \tilde{A}_2 + D_3 P;$$

$$\eta^{VE}(P, \dot{\gamma}) = \exp(b(\dot{\gamma})P), \tag{7}$$

$$b(\dot{\gamma}) = \sum_{n=1}^{N} c_n \exp(-\dot{\gamma}/t_n).$$

In the above expression (7), n is an index of series, N is a number of mode, and a coefficient set $\{c_n, t_n\}$ is used to fit the experimental data.

In addition, the zero-shear-rate viscosity, $\eta_0(T,P)$, can also be expressed as follows:

$$\eta_0(T, P) = B \exp\left(\frac{T_b}{T} + DP\right) \tag{8}$$

Compared to the expression (6) of the zero-shear-rate viscosity having five parameters, the expression (8) of the zero-shear-rate viscosity needs three parameters.

Figure 7:
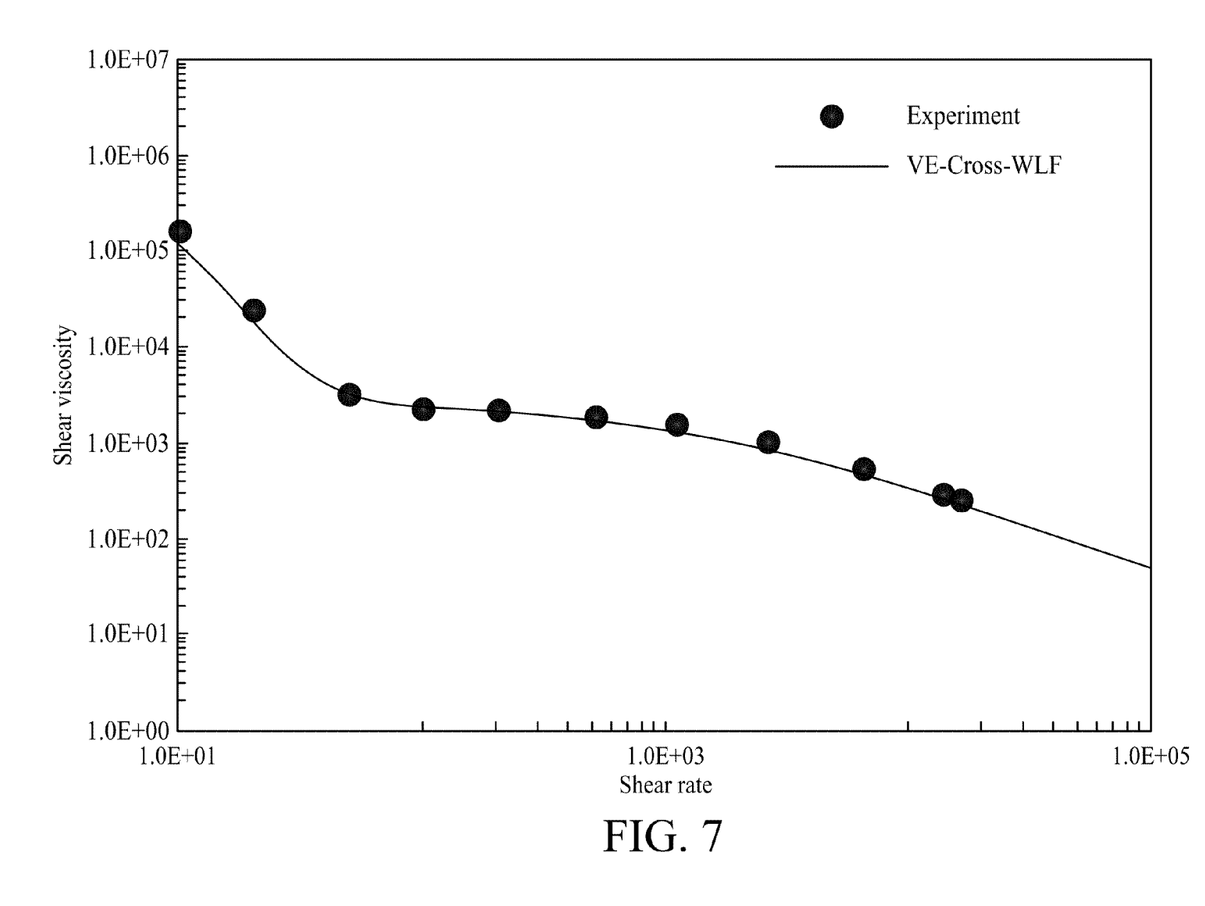
FIG. 7 shows the fitting of the VE-Cross-WLF model with the experimental data in accordance with various embodiments of the present disclosure.

FIG. 7 shows the fitting of the VE-Cross-WLF model with the experimental data in accordance with various embodiments of the present disclosure. As clearly shown in FIG. 7, the proposed VE-Cross-WLF model with a three-region curve fits with the experimental data accordingly. This result proves that the VE zero-shear-rate viscosity term, $\eta_0^{VE}(T,P,\dot{\gamma})$, can precisely and accurately describe the low-shear-rate shear thinning phenomenon, i.e., an increase of a shear viscosity of the molding fluid by a decrease of a shear rate, which describes the elastic characteristic of the molding fluid like the solid in addition to the viscous characteristic of the molding fluid.

The following describes an exemplary process flow of the computer-implemented method for calculating a shrinkage of a molding product (thin plate) in accordance with various embodiments of the present disclosure. In some embodiments, injection molding simulations of the thin plate (about 1.0 mm) with a high injection rate (50 cc/sec) uses the proposed VE-Cross-WLF model, wherein polycarbonate (PC) is used as the molding fluid. The comparisons between the simulation prediction and real experimental results, including the filling rate, the filling pressure, and the warpage state of the finished product are demonstrated here.

Figure 8:
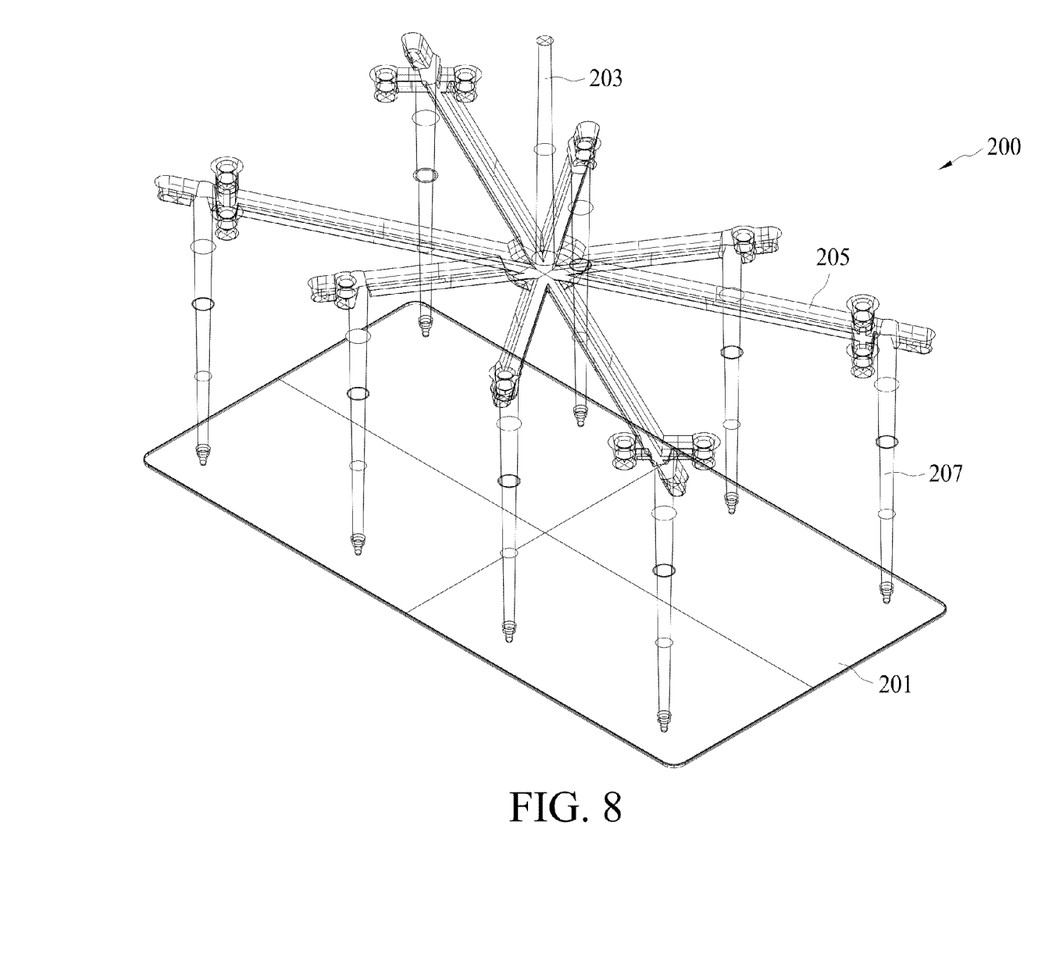
FIG. 8 is a schematic view of a simulating domain in accordance with various embodiments of the present disclosure.

FIG. 8 is a schematic view of a simulating domain 200 in accordance with various embodiments of the present disclosure. In some embodiments, the simulating domain 200, which is obtained from a CAD (Computer Aided Design) model used in design and development of the molding product, includes one thin plate 201 corresponding to the mold cavity 25, one tapered part 203 corresponding to the sprue 21, and several horizontal parts 205 and vertical parts 207 corresponding to the runners 23 of the mold 20.

Figure 9:
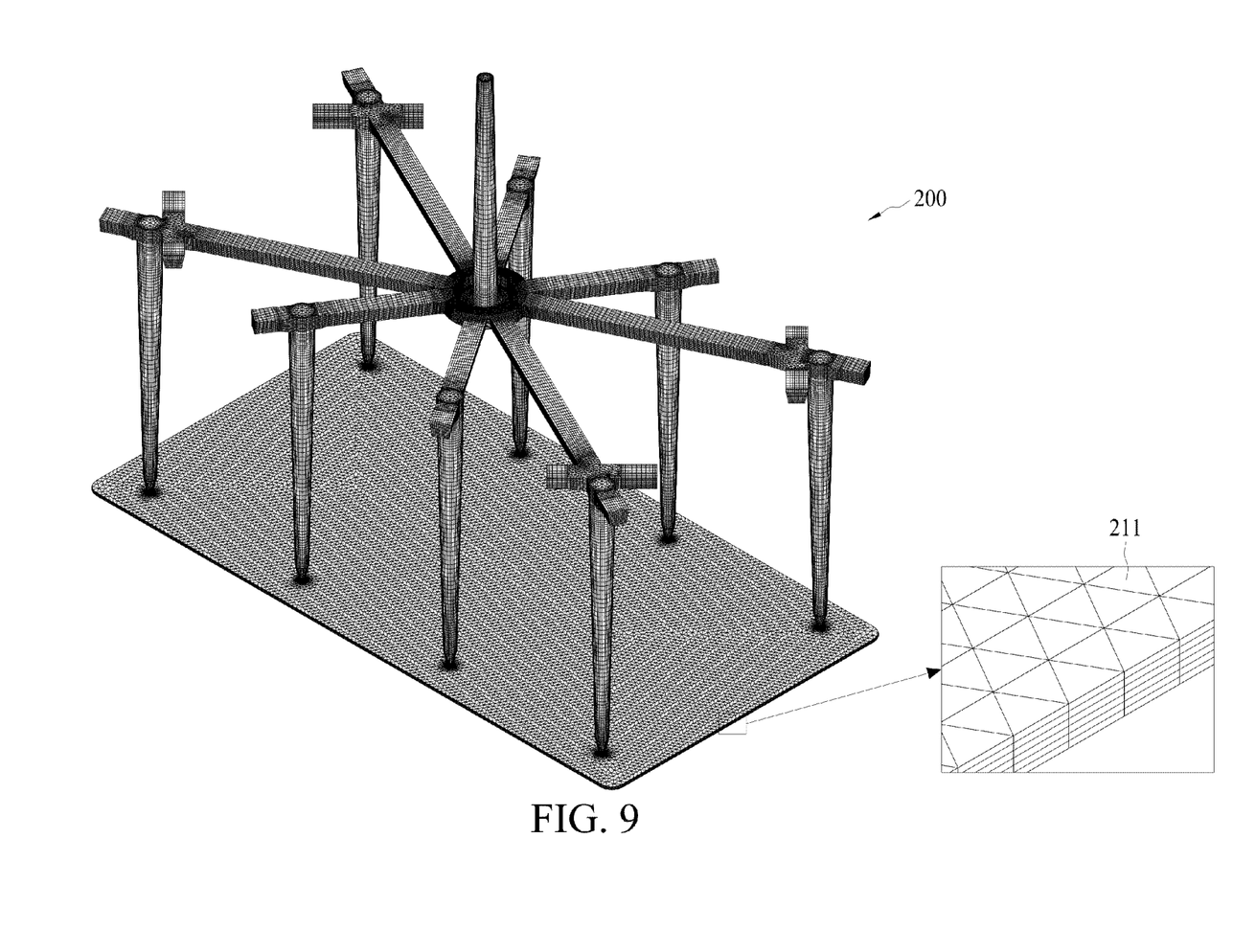
FIG. 9 is a schematic view of a mesh in accordance with various embodiments of the present disclosure.

FIG. 9 is a schematic view of a mesh 210 in accordance with various embodiments of the present disclosure. In some embodiments, the mesh 210 is created by dividing at least part of the simulating domain 200 before actually applying numerical analysis, such as a FEM (finite element method), a FDM (finite difference method) or a FVM (finite volume method), to the simulating domain 200. The creation of the mesh 210 is a technique of modeling an object or fluid region (i.e., the simulating domain 200 of the present embodiment) to be analyzed with a set of elements 211 such as a rectangular mesh, hexahedral mesh or tetrahedral mesh in order to perform the subsequent numerical analysis.

Figure 10:
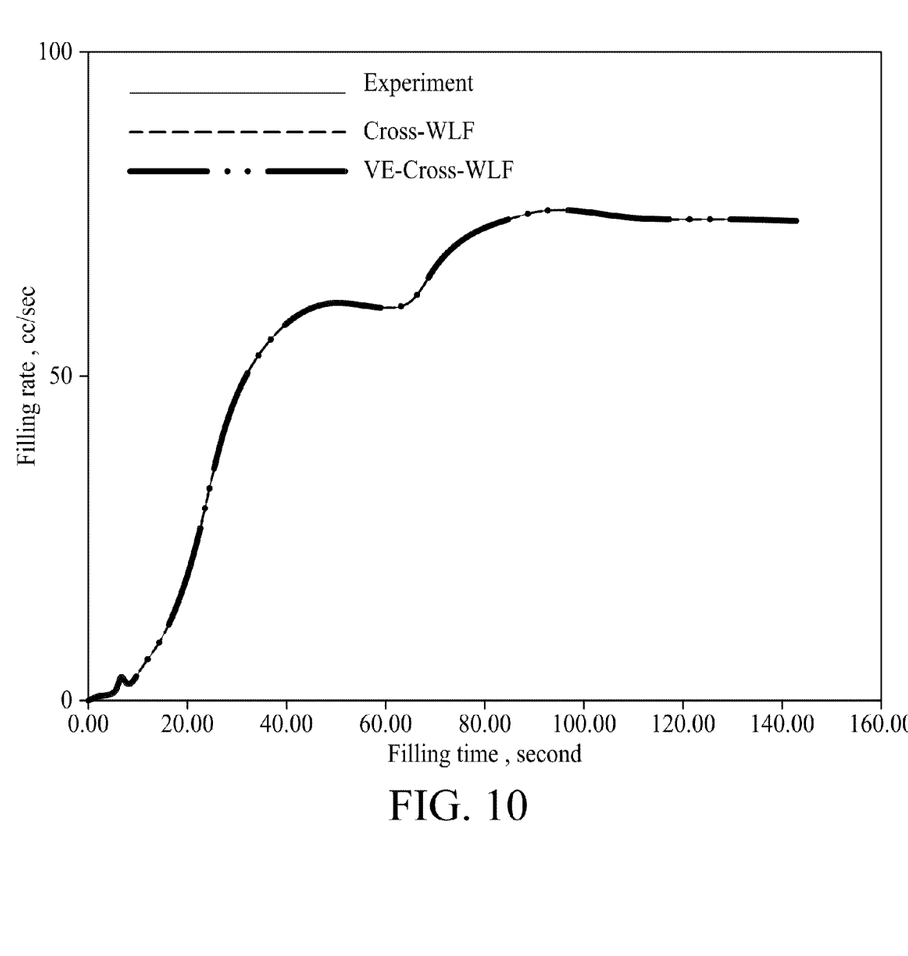
FIG. 10 shows the filling rate with respect to the filling time of the experimental curve and two simulated curves.

FIG. 10 shows the filling rate with respect to the filling time of the experimental curve and two simulated curves. Molding fluid is generally assumed as Generalized Newtonian Fluid (GNF), and the governing equations describing the flow motion of the molding fluid in the injection molding process can be expressed as follows:

$$\frac{\partial \rho}{\partial t} + \nabla \cdot \rho u = 0, \tag{9}$$

$$\frac{\partial}{\partial t}(\rho u) + \nabla \cdot (\rho u u - \sigma) = \rho g, \tag{10}$$

$$\sigma = -pI + \eta(\nabla u + \nabla u^T), \tag{11}$$

$$\rho C_P \left( \frac{\partial T}{\partial t} + u \cdot \nabla T \right) = \nabla \cdot (k \nabla T) + \eta \dot{\gamma}^2, \tag{12}$$

In the above expression, $\rho$ is density; u is velocity vector; t is time; $\sigma$ is total stress tensor; g is acceleration vector of gravity; p is pressure; $\eta$ is viscosity; $C_p$ is specific heat; T is temperature; k is thermal conductivity; and $\dot{\gamma}$ is shear rate. The filling rate can be calculated from the multiplying of the velocity by the cross-section of the sprue. As shown in FIG. 10, it is obvious to see that both simulated curves (Cross-WLF viscosity model and VE-Cross-WLF viscosity model) fit well with the experimental data.

Figure 11:
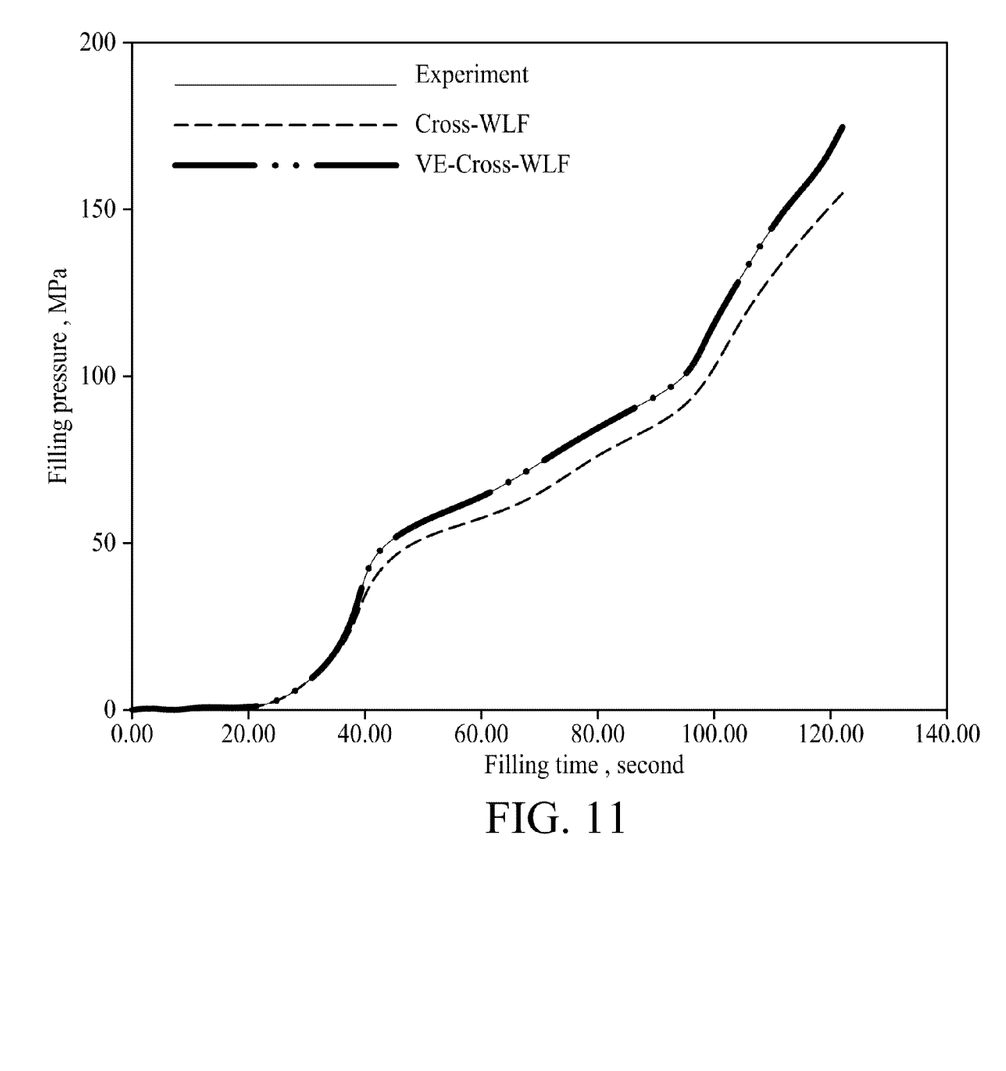
FIG. 11 shows the filling pressure with respect to the filling time of the experimental curve and two simulated curves.

FIG. 11 shows the filling pressure with respect to the filling time of the experimental curve and two simulated curves. After calculating the filling rate, the filling pressure can then be calculated as follows:

$$u = \hat{u} - \frac{\nabla p}{a_p}, \tag{13}$$

$$\nabla \cdot \left( \frac{1}{a_p} \nabla p \right) = \nabla \cdot (\hat{u}), \tag{14}$$

In the above expression, $a_p$ is the discrete coefficient and $\hat{u}$ is the discrete velocity vector. As shown in FIG. 11, the prediction of the pressure history curve and the final maximum pressure by using the Cross-WLF model is now significantly deviated from the experimental data, i.e., underestimating the filling pressure. In contrast, the prediction of the pressure history curve and the final maximum pressure by using the proposed VE-Cross-WLF model appropriately matched the experimental data.

Figure 12:
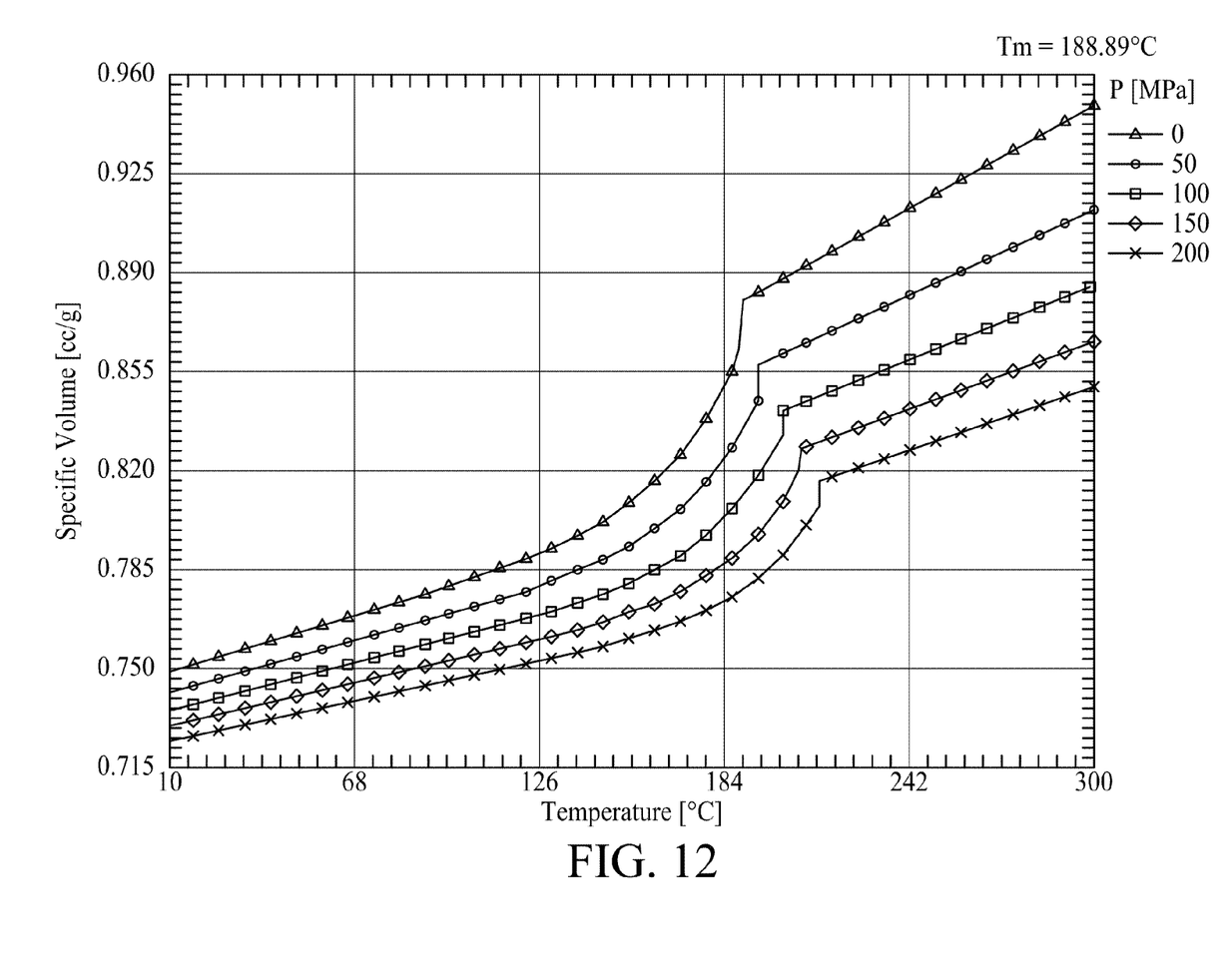
FIG. 12 shows the specific volume variation of the molding fluid with respect to the molding temperature and the molding pressure.

FIG. 12 shows the specific volume variation of the molding fluid with respect to the molding temperature and the molding pressure. After the filling stage, the injection molding process proceeds to the packing process, where the molding pressure of the molding fluid in the molding cavity gradually decreases to the atmospheric pressure from the filling pressure. Similarly, the molding temperature of the molding fluid in the molding cavity gradually decreases to room temperature from the filling temperature.

In some embodiments of the present disclosure the shrinkage of the molding product is calculated by taking into consideration the variation of the specific volume of the molding fluid as the molding pressure and a molding temperature decrease. In an exemplary embodiment, the shrinkages of the molding product at different portions, such as the elements 211 in FIG. 9, are calculated by taking into consideration the difference of the specific volume of the molding fluid between the molding state (the filling pressure and filling temperature) and the de-molding state (the atmospheric pressure and room temperature).

Figure 13:
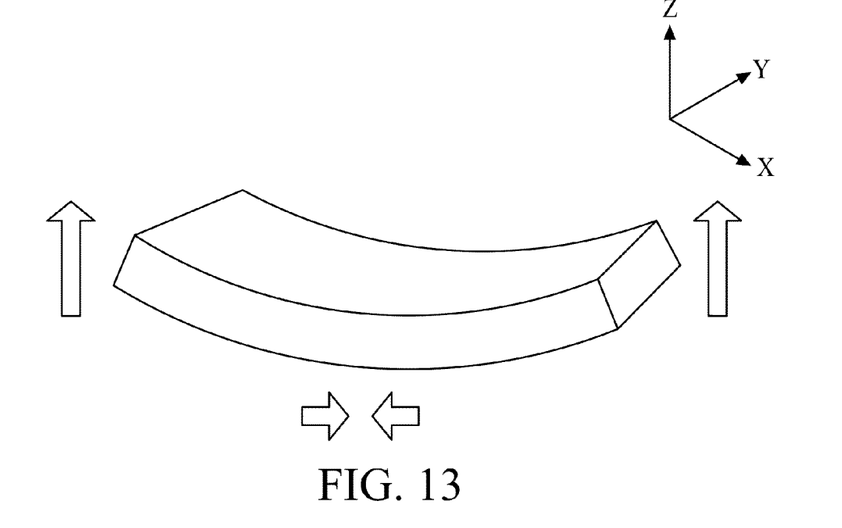
FIG. 13 shows the warpage in the Z-direction of an actual molding product.
Figure 14:
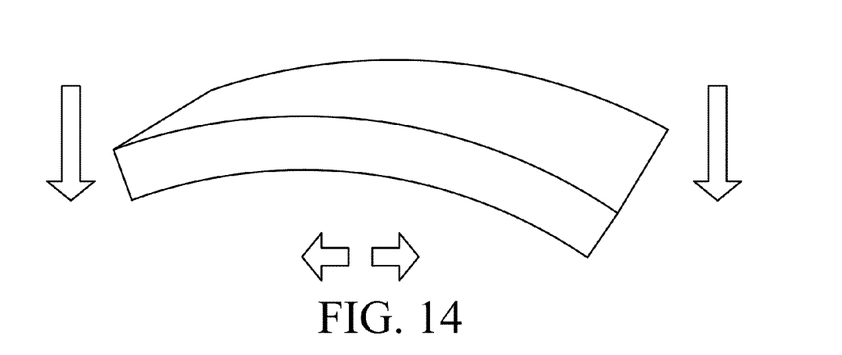
FIG. 14 shows the warpage in the Z-direction of a simulated product by using the Cross-WLF model.
Figure 15:
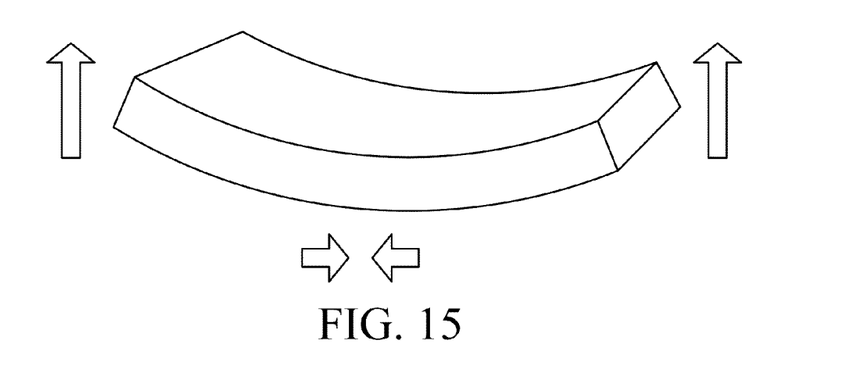
FIG. 15 shows the warpage in the Z-direction of a simulated product by using the VE-Cross-WLF model.

FIG. 13 shows the warpage in the Z-direction of an actual molding product, FIG. 14 shows the warpage in the Z-direction of a simulated product by using the Cross-WLF model, and FIG. 15 shows the warpage in the Z-direction of a simulated product by using the VE-Cross-WLF model, wherein the warpage is caused by the non-uniform shrinkage of the molding product at different portions, such as the different elements 211 in FIG. 9.

The warpage of the actual molding product has an upper concaved shape caused by a non-uniform shrinkage due to a lower packing pressure as shown in FIG. 13. However, by using the Cross-WLF model, the simulation result has a bottom concaved shape due to a higher packing pressure as shown in FIG. 14. In other words, the simulation prediction of the Cross-WLF model is contrary to the actual molding product.

Referring to FIG. 15, in some embodiments, the warpage of the simulated molding product that uses the proposed VE-Cross-WLF model is consistent with that of the actual molding product, wherein both have an upper concaved shape. As a result, this example verifies that the VE-Cross-WLF model of the present disclosure can effectively solve the shrinkage prediction difficulties of common injection molding simulation methods. In some embodiment of the present disclosure, the proposed VE-Cross-WLF model is used in an injection molding simulation to generate a plurality of simulated molding conditions, and the setting of molding conditions in an injection molding machine is performed by taking into consideration of the simulated molding conditions to actually conduct the injection molding in the injection molding machine.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer-implemented method for calculating a shrinkage of a molding product, comprising a step of using a computer processor to calculate the shrinkage of the molding product from a molding fluid by taking into consideration an increase of a shear viscosity of the molding fluid by a decrease of a shear rate;

wherein the increase of the shear viscosity of the molding fluid by the decrease of the shear rate is represented using an expression:

$$\eta^{VE}(P,\dot{\gamma})=\exp(b(\dot{\gamma})P)$$

where $\eta^{VE}$ represents the increase of the shear viscosity, $\dot{\gamma}$ is represents the shear rate, P represents a molding pressure, and $b(\dot{\gamma})$ represents the shear rate;

wherein the shear rate is represented using an expression:
$$b(\dot{\gamma})=\Sigma_{n=1}^{N}C_n\exp(-\dot{\gamma}/t_n)$$
where $C_n$ and $t_n$ are constants.

2. The computer-implemented method according to claim 1, wherein the increase of the shear viscosity by the decrease of the shear rate describes an elastic characteristic of the molding fluid.

3. The computer-implemented method according to claim 1, wherein the shear viscosity of the molding fluid is represented using an expression:

$$\eta = \frac{\eta_0^{VE}}{1+\left(\frac{\eta_0^{VE}\dot{\gamma}}{\tau^*}\right)^{1-n}};$$

$$\eta_0^{VE}=\eta_0(T,P)\eta^{VE}(P,\dot{\gamma});$$

where $\eta$ represents the shear viscosity, $\dot{\gamma}$ represents the shear rate, P represents a molding pressure, T represents a molding temperature, n and $\tau^*$ represent constants, and $\eta^{VE}(P,\dot{\gamma})$ represents the increase of the shear viscosity of the molding fluid by the decrease of the shear rate.

4. The computer-implemented method according to claim 1, further comprises a step of calculating a molding pressure of the molding fluid in a molding cavity by taking into consideration the increase of the shear viscosity of the molding fluid by the decrease of the shear rate.

5. The computer-implemented method according to claim 4, further comprises a step of calculating the shrinkage of the molding products by taking into consideration a variation of a specific volume of the molding fluid as the molding pressure decreases.

6. The computer-implemented method according to claim 5, wherein the calculating of the shrinkage further takes into consideration the variation of the specific volume of the molding fluid as a molding temperature decreases.

7. The computer-implemented method according to claim 6, wherein the calculating of the shrinkage further takes into consideration the variation of the specific volume on different parts of the molding fluid.

8. A non-transitory computer medium containing computer instructions stored therein for causing a computer processor to perform operations for calculating a shrinkage of a molding product, the operations comprising a step of calculating the shrinkage of the molding product from a molding fluid by taking into consideration an increase of a shear viscosity of the molding fluid by a decrease of a shear rate;

wherein the increase of the shear viscosity of the molding fluid by the decrease of the shear rate is represented using an expression:

$$\eta^{VE}(P,\dot{\gamma})=\exp(b(\dot{\gamma})P)$$

where $\eta^{VE}$ represents the increase of the shear viscosity, $\dot{\gamma}$ is represents the shear rate, P represents a molding pressure, and $b(\dot{\gamma})$ represents the shear rate;

wherein the shear rate is represented using an expression:
$$b(\dot{\gamma})=\Sigma_{n=1}^{N}C_n\exp(-\dot{\gamma}/t_n)$$
where $C_n$ and $t_n$ are constants.

9. The non-transitory computer medium according to claim 8, wherein the increase of the shear viscosity by the decrease of the shear rate describes an elastic characteristic of the molding fluid.

10. The non-transitory computer medium according to claim 8, wherein the shear viscosity of the molding fluid is represented using an expression:

$$\eta = \frac{\eta_0^{VE}}{1+\left(\frac{\eta_0^{VE}\dot{\gamma}}{\tau^*}\right)^{1-n}};$$

$$\eta_0^{VE}=\eta_0(T,P)\eta^{VE}(P,\dot{\gamma});$$

where $\eta$ represents the shear viscosity, $\dot{\gamma}$ represents the shear rate, P represents a molding pressure, T represents a molding temperature, n and $\tau^*$ represent constants, and $\eta^{VE}(P,\dot{\gamma})$ represents the increase of a shear viscosity of the molding fluid by the decrease of a shear rate.

11. The non-transitory computer medium according to claim 8, further comprising a step of calculating a molding pressure of the molding fluid in a molding cavity by taking into consideration the increase of the shear viscosity of the molding fluid by the decrease of the shear rate.

12. The non-transitory computer medium according to claim 11, wherein the operations further comprise a step of calculating the shrinkage of the molding products by taking into consideration a variation of a specific volume of the molding fluid as the molding pressure decreases.

13. The non-transitory computer medium according to claim 12, wherein the calculating of the shrinkage further takes into consideration the variation of the specific volume of the molding fluid as a molding temperature decreases.

14. The non-transitory computer medium according to claim 13, wherein the calculating of the shrinkage further takes into consideration the variation of the specific volume on different parts of the molding fluid.

* * * * *